United States Patent
Alt et al.

(10) Patent No.: US 9,869,507 B2
(45) Date of Patent: Jan. 16, 2018

(54) DOMESTIC COOLING APPLIANCE HAVING AT LEAST ONE LIGHT SOURCE AND A RECEIVING MEANS FOR A SHELF

(71) Applicant: BSH HAUSGERAETE GMBH, Munich (DE)

(72) Inventors: René Alt, Munich (DE); Christoph Becke, Grosskarolinenfeld (DE); Max Eicher, Munich (DE); Christine Hartwein, Munich (DE); Philipp Kleinlein, Munich (DE); Tobias Schmidt, Munich (DE); Jochen Scholer, Munich (DE); Ralph Staud, Munich (DE); Thomas Tischer, Haar (DE)

(73) Assignee: BSH Hausgeraete GmbH, Munich (DE)

( * ) Notice: Subject to any disclaimer, the term of this patent is extended or adjusted under 35 U.S.C. 154(b) by 78 days.

(21) Appl. No.: 14/906,013

(22) PCT Filed: Jul. 10, 2014

(86) PCT No.: PCT/EP2014/064829
§ 371 (c)(1),
(2) Date: Jan. 19, 2016

(87) PCT Pub. No.: WO2015/007608
PCT Pub. Date: Jan. 22, 2015

(65) Prior Publication Data
US 2016/0187055 A1   Jun. 30, 2016

(30) Foreign Application Priority Data
Jul. 17, 2013 (DE) .......... 10 2013 214 000

(51) Int. Cl.
*F25D 27/00* (2006.01)
*F21V 33/00* (2006.01)
(Continued)

(52) U.S. Cl.
CPC .......... *F25D 27/00* (2013.01); *F21V 33/0044* (2013.01); *F25D 11/00* (2013.01);
(Continued)

(58) Field of Classification Search
CPC ........ F25D 27/00; F25D 11/00; F25D 23/065; F25D 25/02; F25D 25/024;
(Continued)

(56) References Cited

U.S. PATENT DOCUMENTS

| | | | |
|---|---|---|---|
| 7,163,305 B2 * | 1/2007 | Bienick | A47B 97/00 362/125 |
| 8,911,042 B2 | 12/2014 | Bassi et al. | |
| 9,377,578 B2 | 6/2016 | Gooden | |
| 2012/0043338 A1 | 2/2012 | Yang et al. | |
| 2012/0106129 A1 * | 5/2012 | Glovatsky | F25D 27/00 362/92 |

FOREIGN PATENT DOCUMENTS

| | | |
|---|---|---|
| CN | 102538367 A | 7/2012 |
| DE | 102010061401 A1 | 5/2012 |

(Continued)

*Primary Examiner* — Laura Tso
(74) *Attorney, Agent, or Firm* — Laurence A. Greenberg; Werner H. Stemer; Ralph E. Locher

(57) ABSTRACT

A domestic cooling appliance includes an internal container with four walls delimiting an interior space for receiving food. Receiving devices or receivers are disposed on the inner surfaces of at least the lateral vertical walls of the internal container. At least one shelf can be mounted the receiving devices. At least one light source, which is disposed on at least one receiving device, is configured to illuminate the internal space.

12 Claims, 2 Drawing Sheets

(51) Int. Cl.
  *F25D 11/00* (2006.01)
  *F25D 23/06* (2006.01)
  *F25D 25/02* (2006.01)
  *F21V 8/00* (2006.01)

(52) U.S. Cl.
  CPC ........... *F25D 23/065* (2013.01); *F25D 25/02* (2013.01); *F25D 25/024* (2013.01); *G02B 6/0001* (2013.01); *F25D 2201/14* (2013.01); *F25D 2325/021* (2013.01); *F25D 2325/022* (2013.01)

(58) Field of Classification Search
  CPC ........... F25D 2201/14; F25D 2325/021; F21V 33/0044; G02B 6/0001
  USPC .................. 362/92, 551, 133, 154, 234, 253
  See application file for complete search history.

(56) References Cited

FOREIGN PATENT DOCUMENTS

| | | | |
|---|---|---|---|
| EP | 2420782 | A2 | 2/2012 |
| EP | 2778585 | A2 | 9/2014 |
| JP | S61127394 | U | 8/1986 |
| JP | 2008264399 | A | 11/2008 |
| WO | 2010133478 | A2 | 11/2010 |
| WO | 2012021807 | A2 | 2/2012 |
| WO | 2013076002 | A2 | 5/2013 |

\* cited by examiner

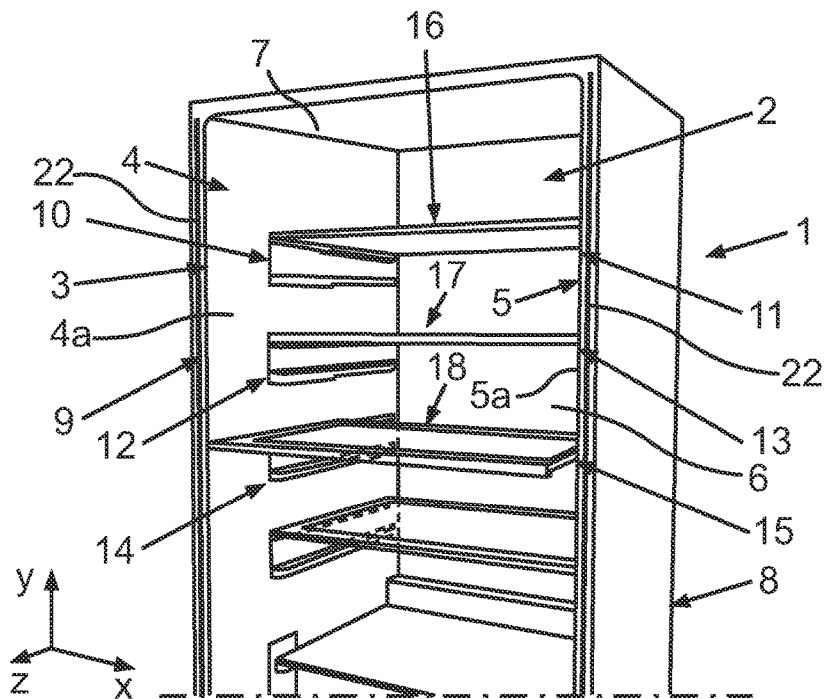
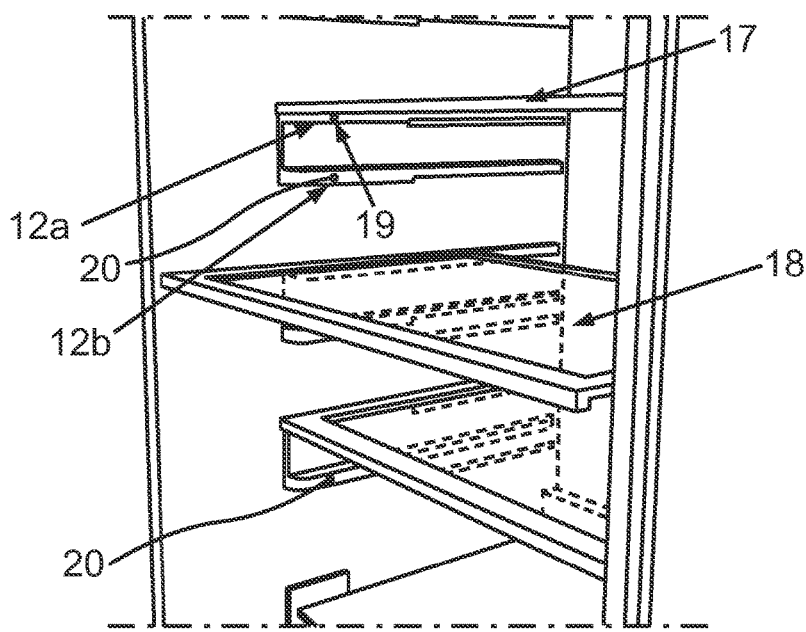
Fig.1
Fig.2

DOMESTIC COOLING APPLIANCE HAVING AT LEAST ONE LIGHT SOURCE AND A RECEIVING MEANS FOR A SHELF

BACKGROUND OF THE INVENTION

Field of the Invention

The invention relates to a domestic cooling appliance having an internal container with walls delimiting an interior space for receiving food, and receiving means are arranged on the internal sides of at least lateral vertical walls of the internal container, on which receiving means at least one shelf can be mounted.

It is known from the prior art that compartment dividers or shelves can be withdrawn and inserted horizontally in an interior space of a domestic cooling appliance. Said shelves are coupled to receiving means which are integrated on vertical side walls of the internal container or are otherwise arranged thereon, and are in particular supported there. A shelf usually extends over the full width of the internal container and in this context also forms a separation plane between two subspaces of the interior space.

It is also known in this context that such an interior space of a domestic cooling appliance is illuminated in particular when the door which closes off the interior space to the front is open. For this purpose, one or more light sources can be arranged which enable an illumination of the interior space to a greater or lesser degree of suitability.

Specifically in the case of embodiments of domestic cooling appliances in which a vacuum insulation panel is arranged in an interspace between the internal container and an external housing in order to provide thermal insulation it is not possible or is possible only to a very limited extent to fit light sources in the area. Since it is not possible to simply penetrate said vacuum insulation panels, while on the other hand fitting over as full an area as possible is desirable for the thermal insulation effect, with currently known solutions it is in part only possible to fit the light sources to a less than optimal degree, with the result that the illumination of the interior space or subspaces thereof is limited.

BRIEF SUMMARY OF THE INVENTION

The object of the present invention is to create a domestic cooling appliance by means of which an improved illumination of the interior space is achieved.

This object is achieved by a domestic cooling appliance as described below.

A domestic cooling appliance according to the invention comprises an internal container with walls delimiting an interior space for receiving food. Said walls comprise two vertical side walls which have internal sides facing the interior space. Receiving means on which at least one shelf can be mounted are embodied in pairs, opposite one another, on the internal sides. Such a shelf or compartment divider is intended for placing or loading the food on.

An important concept of the invention can be seen in the fact that at least one light source which is oriented in order to illuminate the interior space is arranged on at least one receiving means. As a result of such an embodiment, the at least one light source is seated at a very exposed position which enables an improved illumination of the interior space to suit requirements and the situation. As a result of this specific positioning of the light source, an installation space which is in any case present, which is formed by the receiving means which thus usually has a shape extending into the interior space with respect to the inner surface, is utilized in order to enable the light source to be installed and fitted therein. The light source is thereby also displaced inwards in a very specific location and in the interior space and is thus positioned further into the interior space at the vertical wall with respect to the actual inner surface.

Provision is preferably made that in at least one first insertion position of the shelf the light source for emitting light into the interior space is not covered by the shelf, and in a second insertion position which is different from the first insertion position the light source is covered. By means of this embodiment it is possible to produce very individual lighting scenarios which then, depending on the particular insertion position of the shelf in each case, permit the best possible illumination of the interior space and at least of that subspace which is situated beneath the shelf. Particularly when said shelf with its shape and its components is arranged in the respective insertion positions, according to the prior art it is not inconceivable that the illumination is very adversely affected, in particular also if a shelf is extensively loaded with food.

Provision is preferably made that the second insertion position is the fully inserted end position.

In particular, provision is preferably made that the shelf has a light guide which in particular is arranged only in the second insertion position in front of the light source and the light from the light source can be coupled into the light guide. This is a particularly noteworthy embodiment because precisely in that position of the shelf in which it is arranged wholly also in the interior space in its end position, the scenario described above, that the adequate illumination of the interior space is restricted by the shelf itself and/or by food placed thereon, can be improved. As a result of the additional light guide, which is furthermore also arranged on the shelf itself, the illumination is significantly improved locally and in terms of the quantity of light. In this position of the shelf the light source namely no longer emits light directly or only to a small extent directly into the interior space. Rather, as a result of coupling the emitted light into the light guide, an irradiation into the interior space which is different and more extensive over a wider area is achieved locally compared with the light source.

These embodiments thus serve to ensure that in particular in the not yet fully inserted state a substantial illumination of the interior space at least beneath the shelf is effected directly by the light source in the receiving means, and in this second insertion position the light is then at least mainly, in particular wholly, no longer emitted directly by way of the light source into the interior space but is firstly coupled into the light guide and then radiated from there into the interior space.

Provision is preferably made that the light guide is arranged in a front strip of the shelf. This means that in mechanical terms it can be arranged with high positional accuracy and securely. Furthermore, precisely this specific location is very exposed in order to then quasi also enable a noteworthy improvement in illumination to be achieved from the front and above into the subspace formed beneath the shelf.

Provision is preferably made that the front strip covers the light guide from above. This embodiment serves to prevent an undesired and possibly useless light emission taking place upwards through the shelf which may then in any case be covered with food. Rather, as a result of this covering arrangement all the light from the light guide is emitted from above into this subspace formed beneath the shelf with the light guide.

Provision is preferably made that one side of the front strip facing the light guide is embodied as reflective at least in areas, for example has a metallic coating or is otherwise embodied as a reflective surface. The aforementioned advantages can be further improved by this embodiment.

Provision can be made that the front strip has a front cover which covers the light guide on the front side at least in areas. An embodiment can be implemented here wherein the front cover completely covers the light guide on the front side. A potentially undesirable illumination of a user who looks into the interior space when the door is opened is thereby prevented.

On the other hand, it is also however possible that a light emission from the light guide through the front cover can take place at specific locations of the front cover. Light emissions can thereby also be achieved specifically to the front and in particular also obliquely downward to the front. For example, a drawer arranged further below which is then withdrawn can then be illuminated from above so that an improved illumination of such a drawer is also achieved here.

Provision is preferably made that the light guide extends in linear fashion essentially over the full width of the shelf. A very even illumination can thereby be achieved over the full width.

Provision is preferably made that the at least one light source is a light-emitting diode. This is a particularly noteworthy illuminant in this context because it has a very compact and space-saving construction and is particularly suitable for being received and wholly integrated into a receiving means which is usually also very small or narrow. With such a specific type of a light source, the receiving means does not need to be enlarged or otherwise be adapted to the light source. As a result, no restriction of the interior space is caused and the entire movement and component concept does not need to be modified with such a type of a light source.

Provision is preferably made that the shelf has a transparent shelf plate which is surrounded circumferentially by a supporting frame at least in areas. The supporting frame can be fitted nondestructively releasably on the receiving means and arranged for the horizontal displacement of the shelf in the interior space.

The shelf plate can for example be a glass plate or a plastic plate.

Provision is preferably made that a vacuum insulation panel is arranged in an interspace between a vertical wall of the internal container and an external housing of the domestic cooling appliance. In particular, this can be arranged over the full area in said interspace between a vertical wall and the external housing. The invention is especially advantageous particularly in the case of such embodiments because no opening in or any passage through a vacuum insulation panel is then required in order to enable large light sources to be positioned in said interspace and thereby enable the interior space to be illuminated. The thermal insulation effect of the vacuum insulation panel is not adversely affected thereby. Since said vacuum insulation panel is also arranged in the interspace usually especially at those positions at which the receiving means are embodied on the vertical walls in order to enable separation of viable subspaces by the shelves. Particularly favorable aspects of the invention are therefore to improve both the thermal properties and also the illumination in the case of domestic cooling appliances having such vacuum insulation panels.

Further features of the invention will emerge from the claims, the figures and the description of the figures. The features and combinations of features stated above in the description as well as the features and combinations of features stated below in the description of the figures and/or shown by themselves in the figures can be used not only in the combination specified in each case but also in other combinations or in isolation without departing from the scope of the invention. Embodiments of the invention which are not explicitly shown and explained in the figures but emerge from and can be produced by separated combinations of features from the described embodiments are thus also to be regarded as included and disclosed.

BRIEF DESCRIPTION OF THE SEVERAL VIEWS OF THE DRAWING

An exemplary embodiment of the invention will be described in detail in the following with reference to schematic drawings. In the drawings:

FIG. 1 shows a perspective partial view of an exemplary embodiment of a domestic cooling appliance according to the invention;

FIG. 2 shows an enlarged view of a partial section according to FIG. 1;

The same elements or elements having the same function are identified by the same reference characters in the figures.

DESCRIPTION OF THE INVENTION

Figure 3:
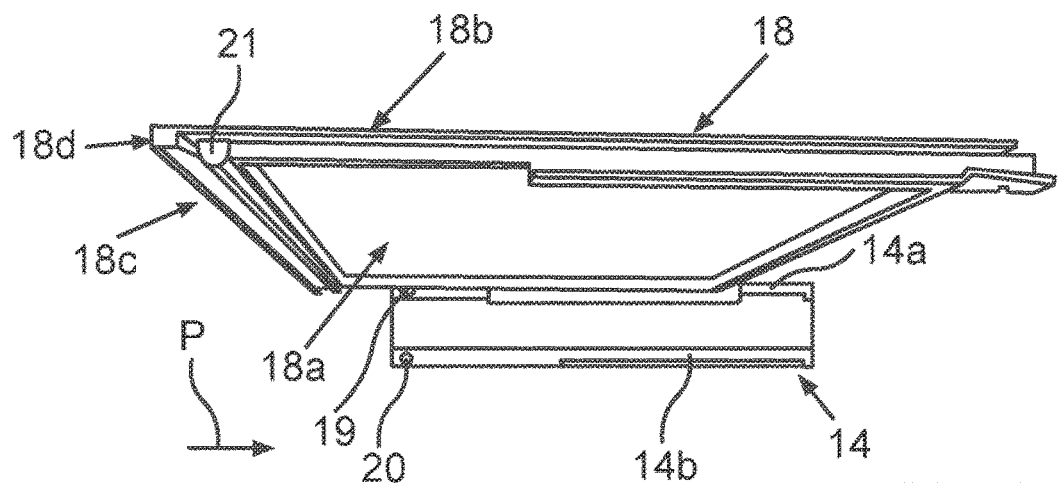
FIG. 3 shows a perspective view of subcomponents of a shelf and a receiving means on an inner surface of a vertical wall of an internal container of the domestic cooling appliance according to FIG. 1 and FIG. 2 in a first insertion position of the shelf.

FIG. 1 shows a perspective view of a domestic cooling appliance which for example can be a refrigerator or a freezer or a refrigerator/freezer combination. The domestic cooling appliance 1 comprises an interior space 2 which is delimited by walls of an internal container 3. In this context the internal container 3 comprises a first lateral vertical wall 4, a second lateral vertical wall 5 situated opposite, a rear wall 6, a roof 7, and a floor not shown in FIG. 1.

At the front the internal container 3 has a loading opening through which the interior space 2 is accessible and which can be closed by means of a door which is not shown.

The domestic cooling appliance 1 furthermore comprises an outer container or an external housing 8 which encloses the internal container 3. An interspace 9 in which thermal insulation material is incorporated is formed between the internal container 3 and the external housing 8. In the exemplary embodiment, provision is made in this context that a vacuum insulation panel 22 is arranged, preferably over the full area, in each case at least between the external housing 8 and the lateral vertical wall 4 and also between the external housing 8 and the lateral vertical wall 5.

As can furthermore be seen in FIG. 1, a plurality of receiving means 10, 11, 12, 13, 14 and 15 are embodied on an inner surface 4a and on an inner surface 5a of the vertical walls 4 and 5, while in addition yet further receiving means are also provided but for the sake of clarity are not identified by further reference characters. The receiving means are arranged in opposing pairs at the same height level, such that for example a first shelf 16 is placed on the receiving means 10 and 11 and thus has a horizontal orientation. A second shelf 17 is arranged on the receiving means 12 and 13, whereas a further shelf 18 is arranged on the receiving means 14 and 15.

The shelves 16 to 18 each extend over the full width (extension in the X direction) of the interior space 2. The interior space 2 is divided into subspaces by the shelves 16 to 18, where the shelves 16 to 18 are in each case used for laying or placing food thereon.

It is shown by way of example that the two shelves 16 and 17 are each arranged in a second insertion position which is characterized by the fully inserted end position.

On the other hand, the shelf 18 is shown in a first insertion position different thereto, which compared with the fully inserted end position represents a somewhat withdrawn insertion position.

As embodied in the exemplary embodiment, a receiving means, for example the receiving means 12 according to the enlarged illustration in FIG. 2, which shows a partial section of the illustration in FIG. 1, comprises a plurality of light sources. The receiving means 12 is thus embodied with an upper horizontal support bar 12a in which a first light source 19 is arranged in integrated fashion. As can be seen from the illustrations in FIG. 1 and FIG. 2, the shelf 17 is arranged on said upper bar 12a. On the opposite side, the shelf 17 is likewise arranged on an upper support bar which is not shown or identified in greater detail.

A further light source 20 is arranged in a lower horizontal support bar 12b belonging to the receiving means 12. A further lower support bar, in which a light source 20 is likewise arranged, is arranged likewise at the same height on the receiving means 13 located opposite, in which case a light source 19 is embodied on the upper support bar of the receiving means 13. As can be seen from the illustration in FIG. 2, the light sources 19 and 20 are arranged in a front third, in particular a front quarter of the length of the support bars.

It should be noted that the light sources 19 and 20 are light-emitting diodes and are installed in the receiving means. They are therefore positioned displaced further inwards into the interior space 2 with respect to the internal sides 4a and 5a.

In an analogous embodiment, the receiving means 10, 11, 14 and 15 are embodied which likewise have at least one light source in each case in the respective bars and these are positioned locally corresponding to the described light sources 19 and 20.

Both the second insertion position of the shelf 17 and also the first insertion position of the shelf 18 can be seen in the illustration in FIG. 2.

FIG. 3 shows a perspective side view from below of the first insertion position of the shelf 18. The shelf 18 comprises a shelf plate 18a embodied to be transparent and a supporting frame 18b circumferentially surrounding said shelf plate 18a. The supporting frame 18b comprises a front strip 18c which is positioned facing away from the rear wall 6.

Arranged in said front strip across the width (X direction, as is defined in FIG. 1) is a light guide 21 which extends in a single piece over what is essentially the full width of shelf 18. The light guide 21 is covered from above by the front strip 18c. It can additionally also be covered on the front side by a front cover 18d of the front strip 18c.

As shown in FIG. 3, the arrangement of the receiving means 14 with the upper support bar 14a and a lower support bar 14b running parallel thereto is configured such that in this first insertion position of the shelf 18 the light source 19 of that support bar 14a on which the shelf 18 is currently seated and is displaced relative thereto is not covered by the shelf 18. The light emitted by the light source 19 is therefore radiated directly into the interior space 2 and in particular into the subspace which is delimited from above by the shelf 18. In addition, the light from the light source 20 is here also radiated correspondingly into said subspace. In this first insertion position, no light from the light sources 19 and 20 is as yet coupled into the light guide 21.

Figure 4:
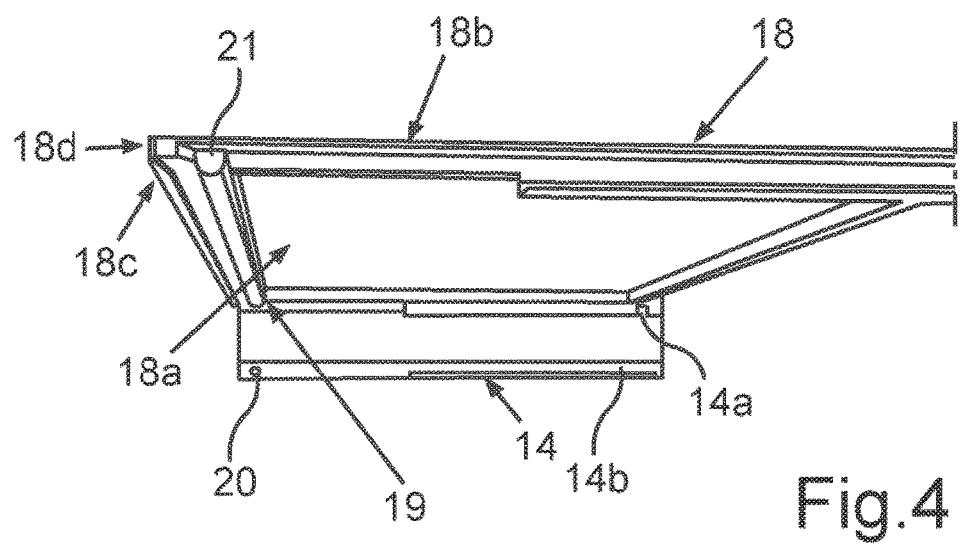
FIG. 4 shows a view according to FIG. 3, wherein the shelf is shown in a second insertion position.

If, based on this first insertion position, the shelf 18 is then inserted in the direction of the arrow P in the depth direction and thus in the Z direction further into the interior space 2, the position according to FIG. 4 is then reached. This position is then the second insertion position and in the exemplary embodiment it is the fully inserted end position. In this position, the light source 19 is covered by the light guide 21 and a direct radiation of the light from the light source 19 into the interior space 2 is quasi prevented or is negligible. In this position, the light from the light source 19 is then coupled essentially completely into the light guide 21 and emitted from the latter evenly along its length into the subspace beneath the shelf 18. The light continues to be radiated directly into said subspace by way of the light source 20. The same takes place with a light source 20 in a lower bar of the receiving means 15, whereas coupling-in of the light from a light source 19 takes place in an upper bar of the receiving means 15 in analogous fashion to coupling in the light from the light source 19 into the upper bar 14a.

According to a further embodiment, provision can be made that the front cover 18d is transparent, at least in areas, to light which is emitted from the light guide 21, with the result that said light can also be emitted to the front or obliquely downward and to the front. It is therefore also possible to illuminate a drawer which is partially withdrawn from the interior space 2 and which is arranged beneath for example the shelf 18, as is shown in FIG. 4.

LIST OF REFERENCE CHARACTERS

1 Domestic cooling appliance
2 Interior space
3 Internal container
4 Lateral vertical wall
4a Inner surface
5 Lateral vertical wall
5a Inner surface
6 Rear wall
7 Roof
8 External housing
9 Interspace
10 Receiving means
10a Support bar
10b Support bar
11 Receiving means
12 Receiving means
13 Receiving means
14 Receiving means
14a Upper support bar
14b Lower support bar
15 Receiving means
16 Shelf
17 Shelf
18 Shelf
18a Shelf plate
18b Supporting frame
18c Front strip
18d Front cover
19 First light source 20 Second light source
21 Light guide
P Arrow

The invention claimed is:

1. A domestic cooling appliance, comprising:
   an internal container having walls with inner surfaces, said walls delimiting an interior space for receiving food and said walls including lateral vertical walls;
   receiving devices disposed on said inner surfaces of at least said lateral vertical walls;
   at least one shelf configured to be mounted on said receiving devices, said at least one shelf having at least one first insertion position and a second insertion position; and
   at least one light source disposed on at least one of said receiving devices and oriented to illuminate said interior space;
   said at least one light source for emitting light into said interior space not being covered by said at least one shelf when said at least one shelf is in said at least one first insertion position; and
   said at least one light source for emitting light into said interior space being covered by said at least one shelf when said at least one shelf is in said second insertion position.

2. The domestic cooling appliance according to claim 1, wherein said second insertion position is a fully inserted end position.

3. The domestic cooling appliance according to claim 1, wherein said at least one shelf has a light guide configured to couple light from said at least one light source into said light guide in said second insertion position.

4. The domestic cooling appliance according to claim 3, wherein said light guide is disposed in front of said at least one light source only in said second insertion position.

5. The domestic cooling appliance according to claim 3, wherein said at least one shelf has a front strip in which said light guide is disposed.

6. The domestic cooling appliance according to claim 5, wherein said front strip covers said light guide from above.

7. The domestic cooling appliance according to claim 5, wherein said front strip has a front cover, and said front cover covers at least some areas of said light guide at a front of the appliance.

8. The domestic cooling appliance according to claim 3, wherein said at least one shelf has a width, and said light guide extends linearly substantially fully over said width of said at least one shelf.

9. The domestic cooling appliance according to claim 1, wherein said at least one light source is a light-emitting diode.

10. The domestic cooling appliance according to claim 1, wherein said at least one shelf has a transparent shelf plate and a supporting frame circumferentially surrounding at least some areas of said shelf plate, and said supporting frame is disposed on said receiving devices to permit a horizontal displacement of said at least one shelf in said interior space.

11. The domestic cooling appliance according to claim 1, which further comprises an external housing defining an intermediate space between at least one of said lateral vertical walls of said internal container and said external housing, and a vacuum insulation panel disposed in said intermediate space.

12. The domestic cooling appliance according to claim 11, wherein said vacuum insulation panel is disposed over a full area of said intermediate space.

* * * * *